UNITED STATES PATENT OFFICE.

HENRY MATHEY, OF NEW YORK, N. Y., ASSIGNOR TO H. G. BOND, OF SAME PLACE.

MANUFACTURE OF CEMENT.

SPECIFICATION forming part of Letters Patent No. 339,673, dated April 13, 1886.

Application filed March 18, 1885. Serial No. 159,309. (No specimens.)

*To all whom it may concern:*

Be it known that I, HENRY MATHEY, a citizen of the United States, residing at New York, in the county of New York and State of New York, have invented certain new and useful Improvements in the Manufacture of Cement; and I do hereby declare that the following is a full, clear, and exact description of the invention, which will enable others skilled in the art to which it appertains to make and use the same.

My invention relates to cements and improved methods for manufacturing them.

Heretofore cement-rock has been burned in kilns or vertical furnaces, the same as limestone in the manufacture of lime. It is not requisite to mention the long time necessary for the burning of the rock, in the present state of the cement industry, as it requires not less than from four to six days for an imperfect burning, and it requires rehandling and three days more reburning for a Portland cement. In this case the burning is not uniform, and therefore the product obtained or resultant cement is irregular in quality. In fact, the cement prepared in this manner gives a widely-varying product.

It has been found that cement-rock, when burned in a kiln or vertical furnace, yields a product widely different in quality. By my method of preparing the rock previous to burning, and in the subsequent burning, I am enabled to obtain a resultant cement not varying in quality, but uniform.

Again, cement-rock, when burned in a kiln or vertical furnace, must of necessity be mixed with more or less of the products of combustion—ashes. There is also an admixture to the ashes of carbon, which is an element of weakness in said cement, and of subsequent deterioration.

In the present case of manufacture the cement-rock, just as it comes from the quarry, is laid in layers in the kiln or stationary furnace, the layers being interposed between the coal or coke. Therefore these masses are not uniformly burned. Consequently, in order to make a Portland cement, a rehandling and loss of time in cooling before reburning is necessary.

By my method of preparing cement—the rock containing all the necessary qualifications without the addition of auxiliary elements—I am enabled to overcome the objections named and present a resultant cement of uniform quality, of less cost, and superior to the ordinary cement made by the old methods. I accomplish this in the following manner: First, in order to make a standard cement, the rock is crushed to such a size that it will pass through a No. 4 mesh screen, which, with modern appliances for crushing, can be done at a nominal price, as cement-rock which contains about sixty per cent. of lime is found to be extremely friable and easily crushed. From the crusher it is conveyed to a furnace specially adapted for this purpose, and which is a revolving cylinder heated by two fireplaces, the discharge from said cylinder being regular and constant. By this arrangement, and without more than one handling, the cement rock is thoroughly burned or calcined. After leaving the furnace it drops into a cooling-chamber, and from thence is transported mechanically to an elevator, which carries it to pulverizers. The revolving cylinder constantly renews the surface of the rock and exposes every particle to an intense and uniform heat, thus quickly dehydrating the rock and giving high calcination to the limestone, which is the principal constituent of cement-rock. For the manufacture of Portland cement, as a higher calcination is necessary, the rock is crushed so as to pass through a No. 8 mesh screen, which is about equal to a screen with sixty-four holes to the square inch. This fineness, by the softness and friability of the cement-rock, can be obtained very cheaply and quickly. In case of quarries—such as in Europe—in which one or two elements—such as lime, quartz, alumina, or magnesia—are usually deficient and must be added, this or these elements must be added in the proper proportion before the introduction of the mass into the cylinder.

It might at first seem that the crushing of the material would increase the cost of manufacture; but against this one extra expense, first, I diminish the cost of labor, being able to do with but one man the work that in the kiln or vertical-furnace method now requires from five to six men to do; second, by the complete utilization of the fuel I accomplish the purposes of manufacture with the consumption of fifty per cent. less of fuel; third, my material being very much finer than in the old methods, the pulverization is done at a much less cost.

It is superfluous to explain that the rock crushed to the fineness stated presents a complete and constant exposure of all its particles to the heat and air, and therefore yields a product superior in strength, quality, and uniformity over the ordinary methods, and is, moreover, free from ashes.

By my method I can obtain a high grade of uniform cement in a burning of thirty to sixty minutes. There may be other means of heating and agitating the crushed material without departing from the spirit of my invention.

The device for calcining the cement-rock forms the subject-matter of an application for patent now pending.

Having thus described my invention, what I claim as new, and desire to secure by Letters Patent, is—

1. The process for making cement, which consists in first crushing the rock to a suitable degree of fineness, then subjecting the rock thus crushed to heat in a revolving cylinder, whereby each particle of the rock is subjected to a heating action sufficient to thoroughly calcine it, and finally pulverizing the calcined material, substantially as set forth.

2. A cement made from cement-rock, said rock being crushed and then heated under agitation and finally pulverized, substantially as and for the purpose set forth.

In testimony whereof I affix my signature in presence of two witnesses.

HENRY MATHEY.

Witnesses:
EMMA M. GILLETT,
JOHN G. KROHR.